United States Patent [19]

Suzuki

[11] Patent Number: 6,085,279
[45] Date of Patent: *Jul. 4, 2000

[54] INTERRUPT CONTROL SYSTEM PROVIDED IN A COMPUTER

[75] Inventor: Hirotaka Suzuki, Tokyo, Japan

[73] Assignee: Kabushiki Kaisha Toshiba, Kawasaki, Japan

[*] Notice: This patent is subject to a terminal disclaimer.

[21] Appl. No.: 09/033,629

[22] Filed: Mar. 4, 1998

Related U.S. Application Data

[63] Continuation of application No. 08/669,919, Jun. 25, 1996, Pat. No. 5,752,043.

[30] Foreign Application Priority Data

Jun. 27, 1995 [JP] Japan .................................. 7-160546

[51] Int. Cl.$^7$ .................................................. G06F 13/26
[52] U.S. Cl. .......................................................... 710/264
[58] Field of Search .................................. 710/260, 264, 710/265, 266, 267

[56] References Cited

U.S. PATENT DOCUMENTS

| | | | |
|---|---|---|---|
| 5,101,497 | 3/1992 | Culley et al. ............................ | 395/725 |
| 5,353,423 | 10/1994 | Hamid et al. ........................... | 395/425 |
| 5,535,420 | 7/1996 | Kardach et al. ........................ | 395/868 |
| 5,752,043 | 5/1998 | Suzuki .................................... | 710/264 |

OTHER PUBLICATIONS

82420/82430 PCI Peripheral Component Interconnect, Intel Corp. (1993) set ISA and EISA Article.

*Primary Examiner*—Ayaz R. Sheikh
*Assistant Examiner*—Xuong Chung-Trans
*Attorney, Agent, or Firm*—Finnegan, Henderson, Farabow, Garrett & Dunner, L.L.P.

[57] ABSTRACT

An interrupt control system is provided in a computer having a processor, a PCI bus, an ISA bus, and a serial transfer line. An interrupt controller outputs interrupt requests to the processor according to the priority levels of signals received from the PCI bus and the ISA bus. Interrupt signals supplied to the interrupt controller from the PCI bus and ISA bus are mapped to a level appropriate for the interrupt controller.

21 Claims, 7 Drawing Sheets

CONFIGURATION REGISTER

| | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|
| 44h | N/U | | | | IRB3-0 | | | ENB | N/U | | | IRA3-0 | | | | ENA |

| | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|
| 46h | N/U | | | | IRD3-0 | | | END | N/U | | | IRC3-0 | | | | ENC |

| | D15 | | | | | | | | | | | | | | | D0 |
|---|---|---|---|---|---|---|---|---|---|---|---|---|---|---|---|---|
| 48h | POLAR 15-0 | | | | | | | | | | | | | | | |

| | | |
|---|---|---|
| 4D0h | LORE15-0 | |

| D15 | D13 | | | | D8 | | | | | D2 | D1 | D0 |
|---|---|---|---|---|---|---|---|---|---|---|---|---|
| | "0" | | | | "0" | | | | | "0" | "0" | "0" |

F I G. 9 ns of a plurality of interrupt
INTERRUPT CONTROL SYSTEM PROVIDED IN A COMPUTER This is a continuation of application Ser. No. 08/669,919, filed Jun. 25, 1996 U.S. Pat. No. 5,752,043, the contents of which are hereby incorporated by reference.

BACKGROUND OF THE INVENTION

1. Field of the Invention

The present invention relates to an interrupt control system provided in a computer, and more particularly to an interrupt control system for controlling the interrupt signals from PCI devices and ISA devices.

2. Description of the Related Art

ISA (Industry Standard Architecture) buses and EISA (Extended Industry Standard Architecture) buses have been widely used as system buses used for personal computers. Recently, however, PCI (Peripheral Component Interconnect) buses have come into use, centering on desktop personal computers, in order to step up the data transfer speed or construct a system architecture independent of processors.

With a PCI bus, almost all data transfer is based on block transfer. Each block transfer is realized by burst transfer, which enables data to be transferred at a speed of up to 133 Mbytes per second on a PCI bus (in the case of a 32-bit data bus).

Therefore, use of PCI buses makes it possible to speed up the data transfer between I/O devices and between the system memory and I/O devices, enhancing the system performance.

Recently, not only desktop personal computers but also notebook or desktop portable personal computers have employed PCI buses.

In a desktop personal computer, optional cards for functional expansion such as PCI expansion cards or ISA expansion cards are installed directly in the expansion slots. In this case, a plurality of interrupt request signal lines differing in the interrupt level (the order of priority of interrupt) are defined for the individual ISA expansion slots to which ISA expansion cards are connected. This enables each ISA expansion card to inform the interrupt controller on the system board of an interrupt request via the interrupt request signal line corresponding to a particular interrupt level given to the card.

However, the interrupt request signal lines (INTA#, INTB#, INTC#, INTD#) used by the PCI devices and PCI expansion cards on the system board differ from the interrupt request signal lines (IRQ0 to IRQ15) used by the ISA devices and ISA expansion cards in the interrupt request signal sensing type and the polarity. Specifically, INTA# to INTD# are of the level sensing type and low active signals, whereas IRQ0 to IRQ15 are of the edge sensing type and high active signals.

Therefore, a system employing a PCI bus must handle two types of interrupt request signals differing in features, with the result that an interrupt controller compatible with 82C59, the standard in the ISA system, cannot be used for a PCI system without any modification.

Accordingly, it is necessary to improve the interrupt controller so that the two types of interrupt requests of IRQ0 to IRQ15 and INTA# to INTD# may be handled.

The portable personal computer has the following problem because it processes the interrupt signal from an ISA expansion card.

Specifically, in a portable personal computer, optional cards, such as PCI expansion cards or ISA expansion cards, are installed via expansion units known as docking stations. In this case, the number of lines drawn into docking station from the portable computer is required to be as small as possible. The reason for this is that an increase in the number of signal lines drawn into the docking station leads to an increase in the number of pins of an LSI interfacing with the docking station mounted on the system board and an increase in the number of pins of a connector connecting the portable personal computer with the docking station. This raises the cost per portable personal computer and lowers the system packaging efficiency.

Therefore, it is undesirable to draw a plurality of interrupt request signal lines (corresponding to IRQ0 to IRQ15) into a docking station. Unless these interrupt request signal lines are drawn into the docking station, such optional cards as ISA expansion cards cannot receive interrupt service of the CPU.

To overcome this problem, there has recently appeared a protocol for enabling an ISA expansion card installed in the docking station to inform the interrupt controller on the system board of an interrupt request signal.

With the protocol, a single exclusive serial data line is used to transfer a plurality of interrupt requests serially.

When the serial interrupt protocol that enables a plurality of interrupt levels to be transferred serially is used, both of PCI expansion cards and ISA expansion cards can be used just by drawing the signal lines corresponding to the PCI bus and the data lines for serial transfer into the docking station and providing a PCI-ISA bridge in the docking station.

Use of such a serial interrupt protocol, however, requires the interrupt controller to be modified so as to be able to deal with not only the aforementioned two types of interrupt requests of IRQ0 to IRQ15 and INTA# to INTD# but also serial interrupts.

SUMMARY OF THE INVENTION

Accordingly, the object of the present invention is to provide an interrupt control system capable of processing multiple types of interrupt request signals and offering suitable service to these interrupt request signals.

According to a first aspect of the present invention, an interrupt control system is provided in a computer having a processor, an interrupt controller capable of outputting an interrupt signal to the processor, a first bus having a plurality of first interrupt signals, and a second bus having a plurality of second interrupt signals. The system comprises: means for for selecting one of said plurality of mapped first interrupt signals and said plurality of second interrupt signals in accordance with signal selection information indicating which type of interrupt signals should be selected, so as to supply selected interrupt signals to signal lines connected to said interrupt controller.

According to a second aspect of the present invention, an interrupt control device is provided in a computer having a processor, an interrupt controller capable of outputting an interrupt signal to the processor, a first bus having a plurality of first interrupt signals, and a second bus having a plurality of second interrupt signals. The device comprises: a configuration register used for mapping interrupt levels onto said plurality of first interrupt signals of said first bus; and an interrupt select circuit for selecting one of said plurality of mapped first interrupt signals and said plurality of second interrupt signals in accordance with signal selection information indicating which type of interrupt signals should be selected, so as to supply selected interrupt signals to signal lines connected to said interrupt controller.

According to a third aspect of the present invention, an interrupt control method is used in a computer having a processor, an interrupt controller capable of outputting an interrupt signal to the processor, a first bus having a plurality of first interrupt signals, and a second bus having a plurality of second interrupt signals. The method comprises the steps of: mapping interrupt levels onto said plurality of first interrupt signals of said first bus; and selecting one of said plurality of mapped first interrupt signals and said plurality of second interrupt signals in accordance with signal selection information indicating which type of interrupt signals should be selected, so as to supply selected interrupt signals to signal lines connected to said interrupt controller.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which.

DETAILED DESCRIPTION OF THE PREFERRED EMBODIMENTS

Hereinafter, referring to the accompanying drawings, an embodiment of the present invention will be explained.

Figure 1:
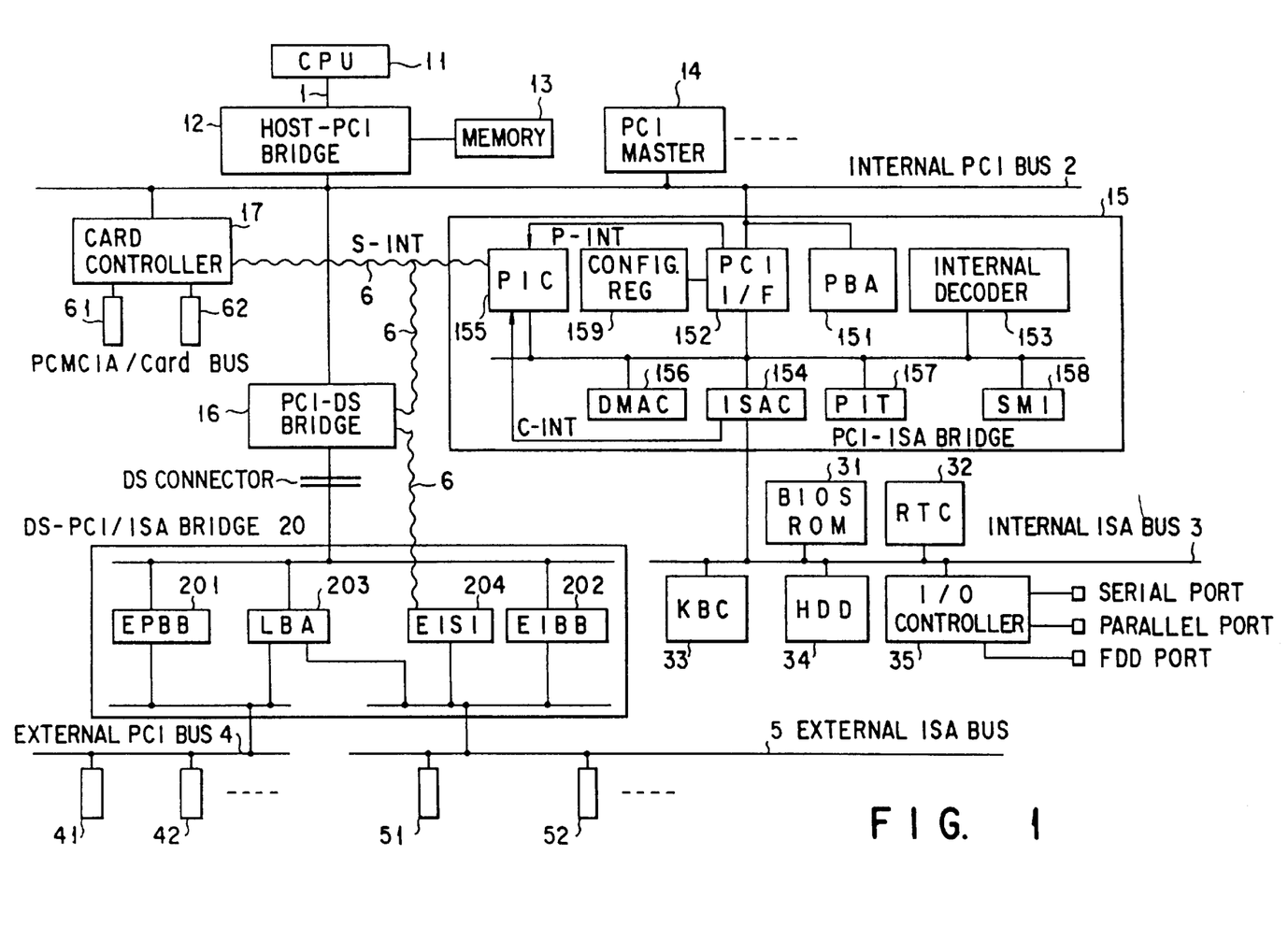
FIG. 1 is a block diagram showing the entire configuration of a computer system provided with an interrupt control system according to an embodiment of the present invention.

FIG. 1 shows the configuration of a computer system according to an embodiment of the present invention. The computer system is a portable personal computer of the notebook type or the laptop type, for example. On its system board, there are provided three types of buses, a processor bus 1, an internal PCI bus 2, and an internal ISA bus 3. In a docking station that can be connected to a DS connector of the portable personal computer body, there are provided an external PCI bus 4 and an external ISA bus 5.

On the system board, there are provided a CPU 11, a host/PCI bridge unit 12, a system memory 13, various PCI master devices 14, an internal PCI-ISA bridge unit 15, a PCI-DS (DS: docking station) bridge unit 16, and a PC card controller 17. In the docking station, there are provided a DS-PCI/ISA bridge unit 20, PCI expansion slots 41, 42 into which PCI expansion cards can be installed, and ISA expansion slots 51, 52 into which ISA expansion cards can be installed.

The CPU 11 is realized by an Intel's microprocessor "Pentium", for example. The processor bus 1 directly connected to the input/output pins has a 64-bit data bus.

The system memory 13 is a memory device that stores an operating system, device drivers, application programs to be executed, and processing data, and is composed of a plurality of synchronous DRAMs. The system memory 13 is connected to a host-PCI bridge unit 12 via a dedicated memory bus having a 32-bit or 64-bit data bus. The data bus in the processor bus 1 may be used as the data bus for the memory bus. In this case, the memory bus consists of an address bus and various memory control signal lines.

The host/PCI bridge unit 12 is a bridge LSI that connects the processor bus 1 to the internal PCI bus 2 and functions as one of the bus masters connected to the internal PCI bus 2. The host/PCI bridge unit 12 has the function of bilaterally converting the bus cycle related to the data and address between the processor bus 1 and the internal PCI bus 2 as well as the function of controlling the accessing of the system memory 13 via the memory bus.

The internal PCI bus 2 is an input/output bus of the clock synchronizing type. All of the cycles on the internal PCI bus 2 are in synchronization with the PCI bus clock. The frequency of the PCI bus clock is 33 MHz at maximum. The internal PCI bus 2 has an address/data bus used in a time sharing manner. The address/data bus has a width of 32 bits.

The data transfer cycle on the PCI bus 2 is composed of an address phase and more than one data phase that follows. In the address phase, an address and a transfer type are specified and in each data phase, 8-bit, 16-bit, 24-bit, or 32-bit data is outputted.

Like the host/PCI bridge unit 12, the PCI master device 14 is one of the bus masters connected to the PCI bus 2 and operates as an initiator or a target. The PCI master device 14 is realized by a graphics controller, for example.

The internal PCI-ISA bridge unit 15 is a bridge LSI connecting the internal PCI bus 2 to the internal ISA bus 3 and is a bus master for the PCI bus 2. Connected to the internal ISA bus 3 are a BIOS ROM 31, a real time clock (RTC) 32, a keyboard controller (KBC) 33, a hard disk drive (HDD) 34, and an I/O port controller 35.

The internal PCI-ISA bridge unit 15 includes a PCI bus arbiter (PBA) 151, a PCI interface (PCI I/F) 152, an internal decoder 153, an ISA controller (ISAC) 154, an interrupt controller (PIC) 155, a DMA controller (DMAC) 156, a system timer (PIT) 157, an SMI generating logic 158, and a configuration register group (CONFIG. REG) 159.

The PCI bus arbiter (PBA) 151 arbitrates in the right to use the PCI bus 2 between all of the bus masters connected to the internal PCI bus 2. For the arbitration, the signal lines (bus request signal REQ# lines and grant signal GNT# lines, each pair of which is allocated to each bus master device) on the internal PCI bus 2 are used.

The bus request signal REQ# is a signal to tell the PCI bus arbiter (PBA) 151 that the corresponding device is requesting to be allowed to use the internal PCI bus 2. The grant signal GNT# is a bus access grant signal to inform the device that has issued the bus request signal REQ# of permission to use the bus.

The PCI interface 152 exchanges addresses, data, commands, PCI interrupt request signals, and various status signals with the internal PCI bus 2. On the PCI bus 2, four interrupt request signal lines (corresponding to INTA#, INTB#, INTC#, and INTD#) are defined. These interrupt request signal lines are shared by PCI devices.

Specifically, each PCI device with a single function uses a PCI interrupt request signal line (corresponding to INTA#) to request service from the CPU 11. Each PCI device with a plurality of functions uses one of the four PCI interrupt request lines (corresponding to INTA#, INTB#, INTC#, and INTD#) to request service from the CPU 11. These four PCI interrupt request signals (corresponding to INTA#, INTB#, INTC#, and INTD#) are of the level sensing type and are low active signals. The PCI interrupt request signals (corresponding to INTA#, INTB#, INTC#, and INTD#), shown by P-INT, are sent to the interrupt controller 155 via the PCI interface 152.

The internal decoder 153 decodes addresses to select one of the devices (the interrupt controller 155, DMA controller 156, system timer 157, and SMI generating logic 158) and configuration register group 159 contained in the PCI-ISA bridge 15 and one of the devices (the BIOS ROM 31, real time clock 32, keyboard controller 33, HDD 34, and I/O port controller 35) on the internal ISA bus 3. What are decoded by the internal decoder 153 include the I/O address, memory address, and configuration address outputted onto the PCI bus 2.

The ISA controller 154 executes an ISA bus cycle for accessing a memory and an I/O on the internal ISA bus 3. The configuration register group 159 is a register group that can be read from and written into in the configuration cycle. In the register group, the control data for controlling the operation of each device in the bridge 15 is set.

The interrupt controller 155 is a programmable interrupt controller (PIC) having an interrupting function equivalent to 82C59 and has a plurality of interrupt inputs (IR0 to IR15), to each of which a priority level is assigned. The interrupt controller 155 determines an interrupt request signal having the highest order of priority among the interrupt inputs from the inside of the system or the expansion cards, and informs the CPU 11 of the determined signal by means of the interrupt inputs. Around the interrupt controller 155, there is provided a hardware logic (which is not shown in FIG. 1 and will be explained later in detail in FIG. 3) for processing the following three types of interrupt request signals.

P-INT: Interrupt request signals (INTA# to INTD#) from PCI devices

C-INT: Interrupt request signals (IRQ0 to IRQ15) from ISA devices on the internal ISA bus or in the bridge 15

S-INT: Serial interrupt request signals from expansion ISA cards or PC cards

The interrupt request signals INTA# to INTD# from PCI devices are of the level sensing type and are low active signals as described above. When each PCI device requests interrupt service from the CPU 11, it makes the corresponding PCI interrupt request signal (INTA# to INTD#) low.

The interrupt request signals IRQ0 to IRQ15 from ISA devices are of the edge sensing type and are high active signals. Specifically, when each ISA device requests interrupt service from the CPU 11, it raises the corresponding ISA interrupt request signal (IRQ0 to IRQ15) from the low to the high level. Sensing the rising edge, the interrupt controller 155 recognizes the occurrence of an interrupt request signal.

The serial interrupt request signal is an interrupt request signal transferred serially from the DS-PCI/ISA bridge 20 or card controller 17 in the docking station according to the serial protocol. Exclusive serial transfer lines 6, which consist of a single data line and a single serial clock line, are used for the transfer of the serial interrupt request signal.

The interrupt controller 155 is designed to switch the signal sensing type for each interrupt input so as to be able to respond to an interrupt request signal of either the level sensing or the edge sensing type.

The PCI-DS bridge unit 16 is a bridge LSI that connects the internal PCI bus 2 to a docking bus equivalent to the PCI bus drawn into the docking station. The PC card controller 17 is one of the PCI bus masters and controls the PC cards installed in the card slots 61, 62 complying with the PCMCIA/Card bus specifications. IRQx from the PC cards controlled by the PC card controller 17 is transferred serially to the interrupt controller 155.

The DS-PCI/ISA bridge unit 20 is a bridge LSI that connects a docking bus (equivalent to the PCI bus) drawn from the computer body into the docking station via the DS connector to the external PCI bus 4 and external ISA bus 5. Like the PC card controller 17, the DS-PCI/ISA bridge unit 20 is one of the PCI bus masters.

The DS-PCI/ISA bridge unit 20 is provided with an external PCI bus bridge (EPBB) 201, an external ISA bus bridge (EIBB) 202, a local bus arbiter (LBA) 203, and an external ISA serial interrupt generator circuit (External ISA S-INT: EISI) 204.

The EPBB 201 receives the memory cycle and I/O cycle generated on the internal PCI bus 2 by way of the PCI-DS bridge 16 and transmits them onto the external PCI bus 4. When the right to use the bus has been given to a PCI expansion card installed in either the expansion slot 41 or 42 on the external PCI bus 4, the EPBB 201 causes the bus transaction on the external PCI bus 4 to appear on the docking bus.

The EIBB 202 receives the memory cycle and I/O cycle generated on the internal PCI bus 2 via the PCI-DS bridge 16, performs protocol conversion of them, and transmits the resulting signals onto the external ISA bus 5. When the right to use the bus has been given to an expansion ISA master card installed in either the expansion slot 51 or 52 on the external ISA bus 5, the EIBB 202 causes the bus transaction on the external ISA bus 5 to appear on the docking bus.

The LBA 203 arbitrates between the bus use request from the PCI expansion card on the external PCI bus 4 and the bus use request from the ISA expansion card on the expansion ISA bus 5.

The EISI 204 transfers the interrupt request signal IRQx from an ISA expansion card on the external ISA bus 5 serially through the serial transfer lines 6 to the interrupt controller 155 by way of the PCI-DS bridge 16. The transmission timing of IRQx in serial transfer is shown in FIG. 2.

Figure 2:
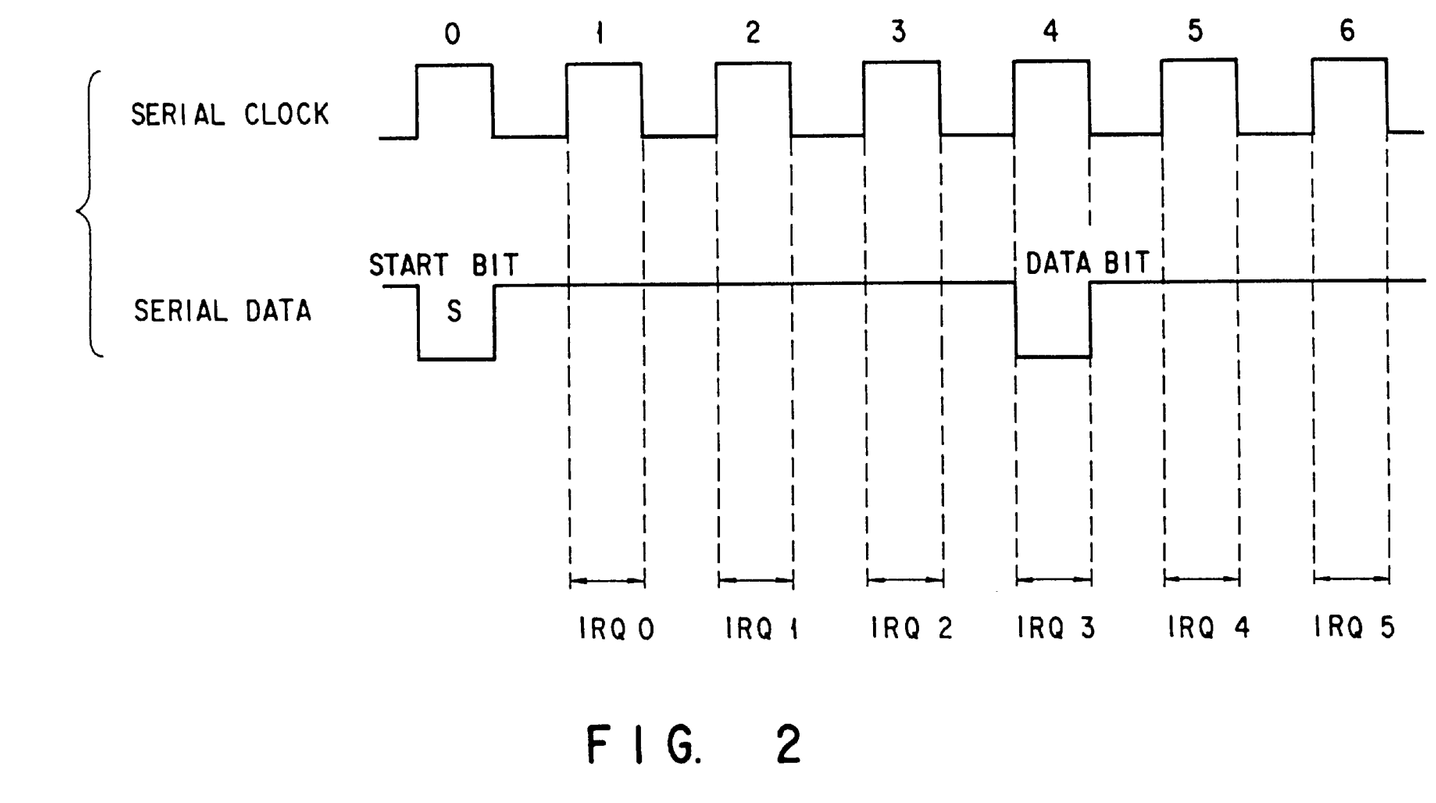
FIG. 2 is a timing chart for the transfer timing of serial interrupt used in the computer system of FIG. 1.

As shown in FIG. 2, EISI 204 first transmits a start bit (S) in synchronization with the serial clock and then transmits the interrupt level (the order of priority of interrupt) of the interrupt request signal generated on the external ISA bus 5, using 16 clock frames that follow the start bit. A low clock frame indicates that there is an interrupt request, whereas a high clock frame indicates that there is no interrupt request. FIG. 2 shows a case where interrupt request IRQ3 of interrupt level 3 is generated from an external ISA expansion card. At this time, if another external ISA expansion card has generated interrupt request IRQ4 of interrupt level 4, both of clock frames 4 and 5 corresponding to IRQ3 and IRQ4 respectively, go low.

Explained next by reference to FIG. 3 will be PIC peripheral hardware provided in the bridge 15 to cause the interrupt controller 155 to process three types of interrupt requests (P-INT, C-INT, S-INT).

The PIC peripheral hardware, as shown in the figure, comprises an S-INT interface 301, a C-INT interface 302, a P-INT interface 303, a serial/parallel converter circuit 304, a serial/ISA interrupt select circuit 305, an ISA/PCI interrupt select circuit 306, a polarity switching circuit 307, a serial/ISA select register 308, an ISA/PCI select register 309, a polarity reversing register 310, and a level/edge switching register 311.

In the PIC peripheral hardware, the serial interrupt request signal S-INT is received by the S-INT interface 301, which sends it to the serial/parallel converter circuit 304, which resolves it into a plurality of interrupt request signals SIRQ corresponding to the interrupt levels.

Of the ISA interrupt request signals IRQ0 to IRQ15, IRQ0, IRQ1, IRQ8, and IRQ13 are allocated fixedly to internal ISA devices. IRQ2 is used for cascade connection of the interrupt controller 155. As a result, the interrupt levels that can be used actually in serial interruption are the remaining eleven interrupt levels, excluding level 0, level 1, level 2, level 8, and level 13. Accordingly, the serial interrupt request signal S-INT is resolved into eleven serial interrupt request signals SIRQ by the serial/parallel converter circuit 304. These eleven serial interrupt request signals SIRQ are sent to the serial/ISA interrupt select circuit 305.

According to the selection information written in the serial/ISA select register 308, the serial/ISA interrupt select circuit 305 selects, for each level, either the serial interrupt request signal SIRQ or the interrupt request signal (hereinafter, also referred to as IIRQ0 to IIRQ15) from the internal ISA device received from the C-INT interface 302.

Figure 4:
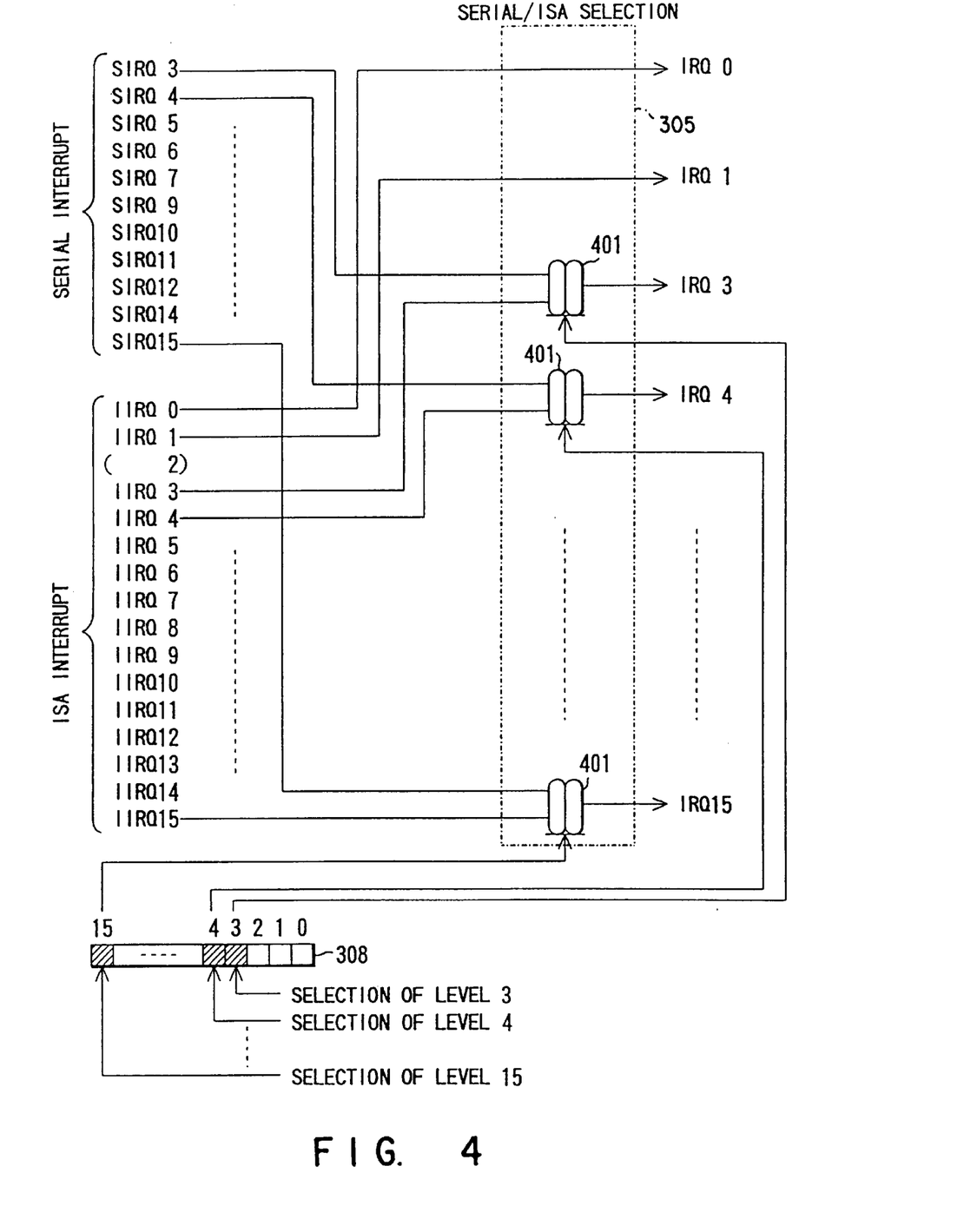
FIG. 4 is a block diagram of a serial/ISA select circuit and a serial/ISA select register provided in the peripheral hardware of FIG. 3.

FIG. 4 shows a concrete configuration of the serial/ISA interrupt select circuit 305 and the data structure of select information written in the serial/ISA select register 308.

The serial/ISA select register 308 is a 16-bit configuration register that can be programmed by the CPU 11. In this register, selection data indicating which of serial interrupt request signal SIRQ and internal ISA interrupt request signal IIRQ is selected is set for each of level 0 to level 15. In this case, data "1" indicates selection of serial interrupt, whereas "0" indicates selection of internal ISA interrupt. Because interrupt levels 0, 1, 2, 8, and 13 cannot be used in serial interrupt, however, the bits corresponding to these levels are fixed to data "0".

The eleven serial interrupt request signals SIRQ3 to SIRQ7 and SIRQ9 to SIRQ15 and fifteen internal ISA interrupt request signals IIRQ0, IIRQ1, and IIRQ3 to IIRQ15 are inputted to the serial/ISA interrupt select circuit 305. The internal ISA interrupt request signals IIRQ0, IIRQ1, IIRQ8, and IIRQ13 corresponding to the interrupt levels 0, 1, 8, and 13 that cannot be used in serial interrupt are passed as they are and are outputted as IRQ0, IRQ1, IRQ2, IRQ8, and IRQ13. The eleven selectors 401 provided so as to correspond to the remaining eleven interrupt levels 3 to 7, 9 to 12, 14, and 15, respectively, select either serial interrupt or internal ISA interrupt according to the corresponding selection data.

Figure 3:
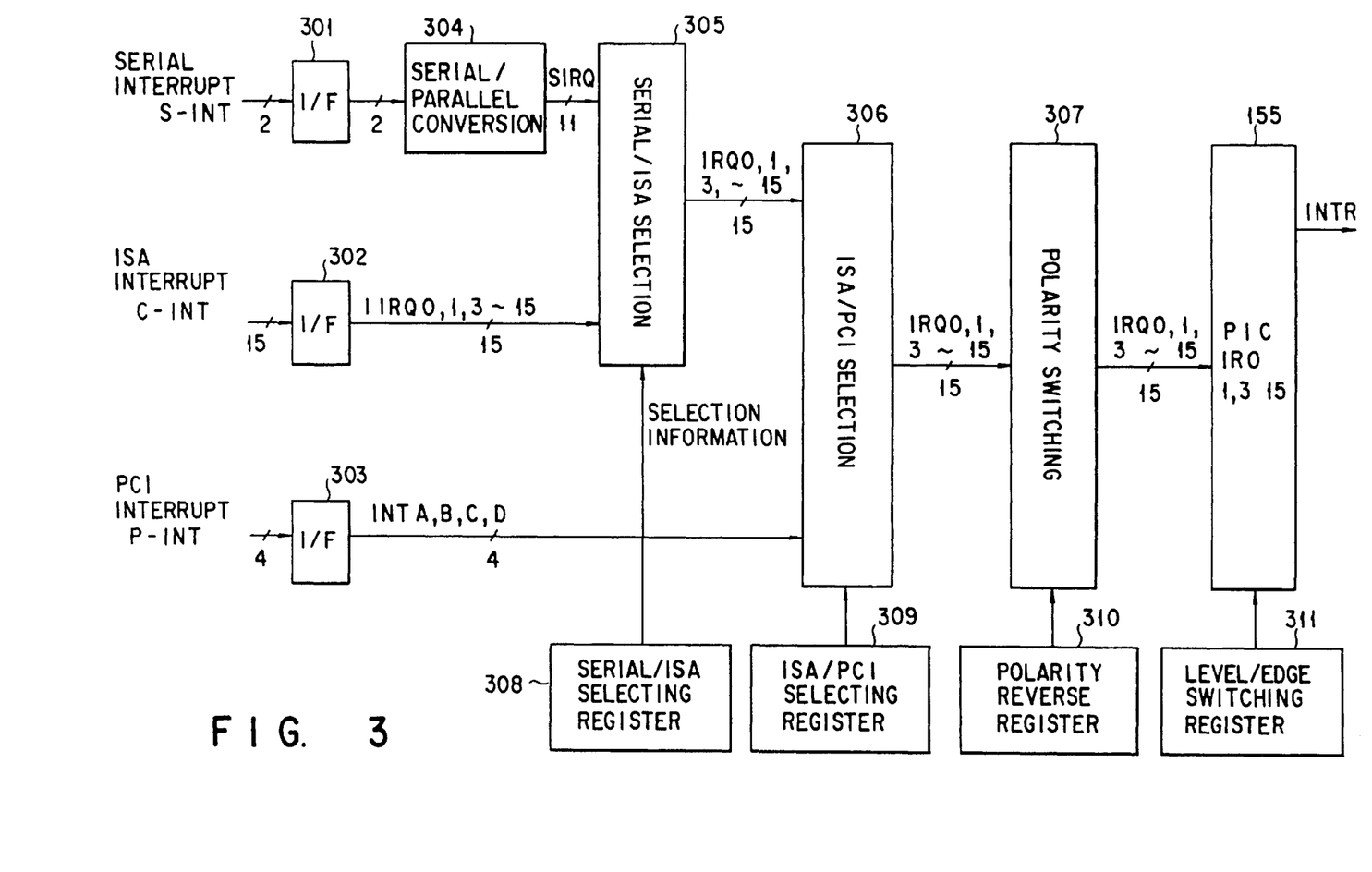
FIG. 3 is a block diagram of an interrupt controller realizing the interrupt control system in the computer system of FIG. 1 and its peripheral hardware.

The fifteen interrupt request signals IRQ0, IRQ1, and IRQ3 to IRQ15 outputted from the serial/ISA interrupt select circuit 305 are sent to the first input port of the ISA/PCI interrupt select circuit 306 as shown in FIG. 3.

The PCI interrupt request signals INTA# to INTD# from the PCI devices received from the P-INT interface 303 are inputted to the second input port of the ISA/PCI interrupt select circuit 306.

The ISA/PCI interrupt select circuit 306 selects either the interrupt request signal from the serial/ISA interrupt select circuit 305 or the PCI interrupt request signal from the P-INT interface 303 and outputs the selected signal. The select circuit 306 refers to the level allocation information set in the ISA/PCI select register 309.

Figure 5:
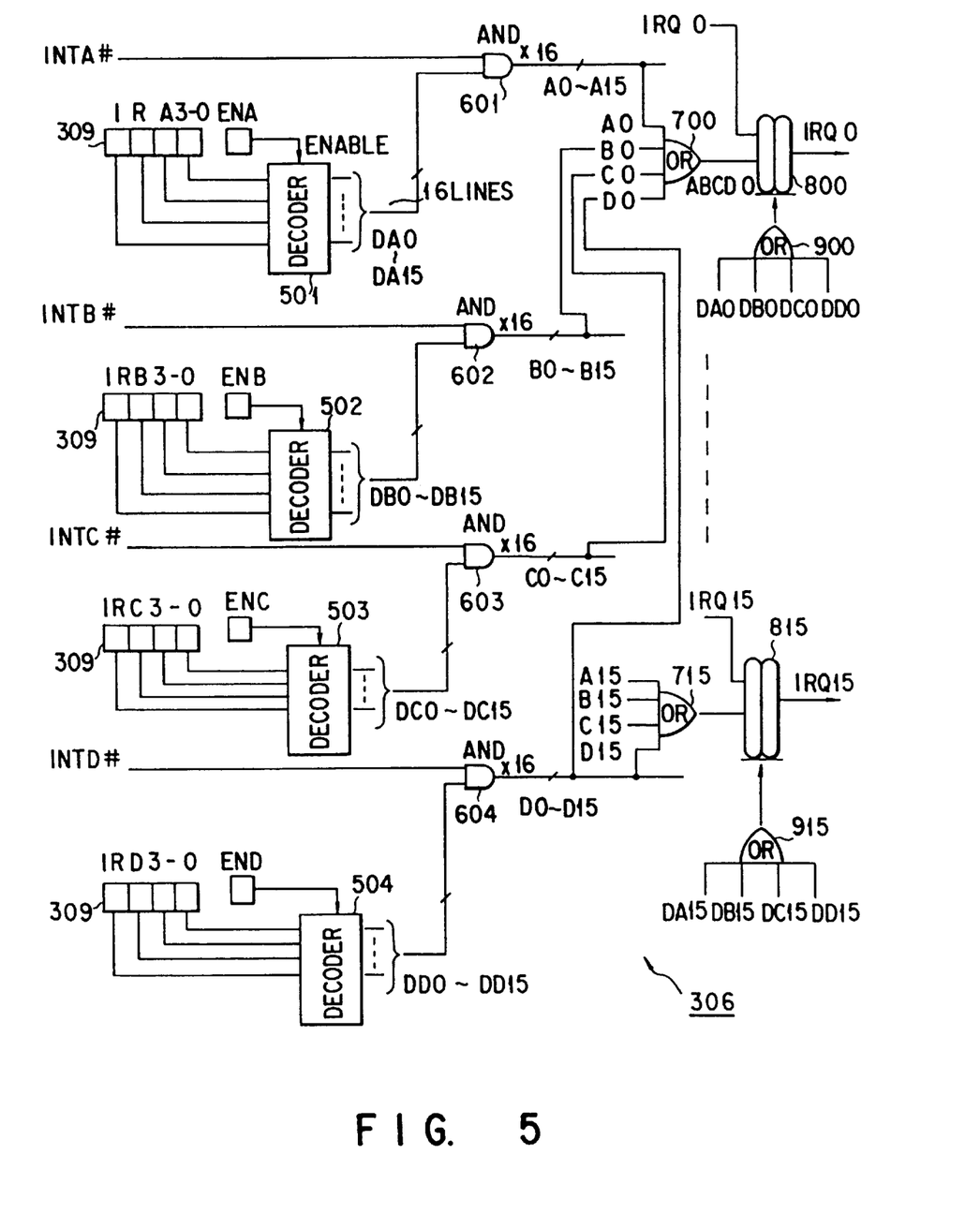
FIG. 5 is a block diagram of an ISA/PCI select circuit and an ISA/PCI select register provided in the peripheral hardware of FIG. 3.
Figure 6A:
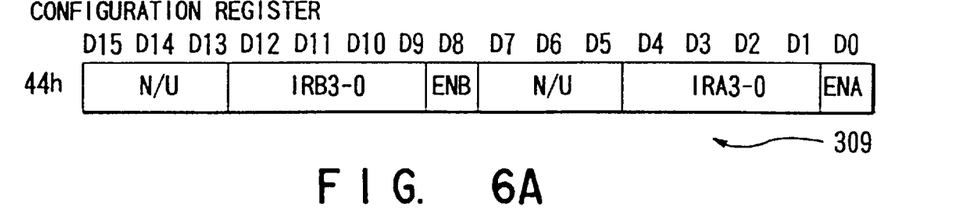
FIGS. 6A and 6B are drawings to help explain the data contents of the ISA/PCI select register referred to at the peripheral hardware of FIG. 3.
Figure 6B:
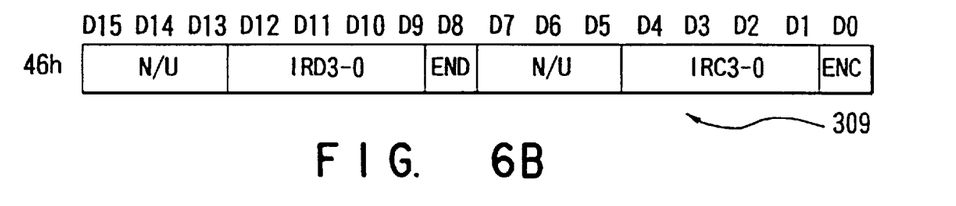

FIG. 5 shows the configuration of the ISA/PCI interrupt select circuit 306 and the ISA/PCI select register 309. FIGS. 6A and 6B illustrate the data structure of the level allocation information written in the ISA/PCI select register 309.

First, the level allocation information written into the ISA/PCI select register 309 will be explained. As shown in FIGS. 6A and 6B, the ISA/PCI select register 309 is composed of two 16-bit configuration registers that can be programmed by the CPU 11. In this register, pieces of level allocation information IRA3 to IRA0, IRB3 to IRB0, IRC3 to IRC0, and IRD3 to IRD0 are set, each piece consisting of 4-bit data.

IRA3 to IRA0 specify an interrupt level to be allocated to INTA# among the interrupt levels 0 to 15. Similarly, IRB3 to IRB0 specify an interrupt level to be allocated to INTB#; IRC3 to IRC0 specify an interrupt level to be allocated to INTC#; and IRD3 to IRD0 specify an interrupt level to be allocated to INTD#.

Furthermore, in the ISA/PCI select register 309, four enable bits ENA to END are set. ENA to END each specify the presence or absence of level allocation of INTA# to INTD#, that is, specify whether or not INTA# to INTD# are used. "1" indicates that it is used and "0" indicates that it is not used.

Now, referring to FIG. 5, a concrete configuration of the ISA/PCI interrupt select circuit 306 will be described.

The ISA/PCI interrupt select circuit 306 is provided with four interrupt level decoders 501 to 504 that each determine an interrupt level allocated to each of INTA# to INTD# according to IRA3 to IRA0, IRB3 to IRB0, IRC3 to IRC0, and IRD3 to IRD0. The operation of these decoders 501 to 504 is enabled and disabled by ENA to END. The ISA/PCI interrupt select circuit 306 is also provided with 16 PCI/ISA selectors 800 to 815 corresponding to the interrupt inputs (IR0 to IR15) of the interrupt controller 155 respectively. These PCI/ISA selectors 800 to 815 each select either a PCI interrupt request signal or an ISA interrupt request signal and send the selected signal to the corresponding interrupt input. The connection between INTA# to INTD# and the PCI/ISA selectors 800 to 815 is determined on the basis of the results of the decoding at the interrupt level decoders 501 to 504.

Specifically, to give a specific interrupt level to INTA#, the decoder 501 makes one of the 16 decoder output signals DA0 to DA15 low according to the level allocation information IRA3 to IRA0 indicating the interrupt level to be allocated to INTA#. These decoder output signals DA0 to DA15 are sent to the second inputs of 16 AND circuits 601 respectively, to the first inputs of which INTA# is sent equally. The outputs A0 to A15 from these 16 AND circuits 601 correspond to the first inputs of sixteen 4-input OR circuits 700 to 715.

The PCI/ISA selectors 800 to 815 provided so as to correspond to the 16 interrupt levels respectively, each select either the outputs of the OR circuits 700 to 715 or the outputs IRQ0 to IRQ15 from the serial/ISA interrupt select circuit 305.

To give a specific interrupt level to INTB#, the decoder 502 makes one of the 16 decoder output signals DB0 to DB15 low according to the level allocation information IRB3 to IRB0 indicating the interrupt level to be allocated to INTB#. These decoder output signals DB0 to DB15 are sent to the second inputs of 16 AND circuits 602 respectively, to the first inputs of which INTB# is sent equally. The outputs B0 to B15 from these 16 AND circuits 602 correspond to the second inputs of sixteen 4-input OR circuits 700 to 715.

To give a specific interrupt level to INTC#, the decoder 503 makes one of the 16 decoder output signals DC0 to DC15 low according to the level allocation information IRC3 to IRC0 indicating the interrupt level to be allocated to INTC#. These decoder output signals DC0 to DC15 are sent to the second inputs of 16 AND circuits 603 respectively, to the first inputs of which INTC# is sent equally. The outputs C0 to C15 from these 16 AND circuits 603 correspond to the second inputs of sixteen 4-input OR circuits 700 to 715.

To give a specific interrupt level to INTD#, the decoder 504 makes one of the 16 decoder output signals DD0 to DD15 low according to the level allocation information IRD3 to IRD0 indicating the interrupt level to be allocated to INTD#. These decoder output signals DD0 to DD15 are sent to the second inputs of 16 AND circuits 604 respectively, to the first inputs of which INTD# is sent equally. The outputs D0 to D15 from these 16 AND circuits 604 correspond to the second inputs of sixteen 4-input OR circuits 700 to 715.

The selecting operation of the PCI/ISA selectors 800 to 815 are controlled by the outputs of OR circuits 900 to 915. For instance, in the case of PCI/ISA selector 800, if any one of the level 0 outputs (DA0 to DD0) from the decoders 501 to 504 is set low, PCI interrupt, or the output of OR circuit 700, will be selected.

With the ISA/PCI interrupt select circuit 306 thus constructed, an arbitrary interrupt level can be allocated to each of INTA# to INTD# related to PCI interrupt. This makes it possible to relate INTA# to INTD# allocated to the interrupt levels to IRQ0 to IRQ15 associated with ISA interrupt or serial interrupt in such a manner that the former correspond to the latter at the same interrupt level. As a result, the selection between ISA/PCI is possible and the interrupt signals of only one type, IRQ0 to IRQ15, can be outputted.

In the above case, the same interrupt levels can be set repeatedly in INTA# to INTD#. For example, when INTA# and INTB# are both set at interrupt level 3, even if either INTA# or INTB# is generated, it will be outputted as IRQ3.

Because neither internal ISA interrupt nor PCI interrupt uses interrupt level 2, only 15 AND circuits 601 to 604 and 15 selectors are actually needed in FIG. 5.

The interrupt request signals IRQ0 to IRQ15 (internal ISA interrupt/serial interrupt/PCI interrupt) outputted from the ISA/PCI interrupt select circuit 306 are sent to the polarity switching circuit 307 as shown in FIG. 3.

The polarity switching circuit 307 controls, for each level, the polarity switching of the interrupt request signals IRQ0 to IRQ15 outputted from the ISA/PCI interrupt select circuit 306, according to the polarity switching information set in the polarity reversing register 310. The data structure of the polarity switching information set in the polarity reversing register 310 is shown in FIG. 7.

Figure 7:
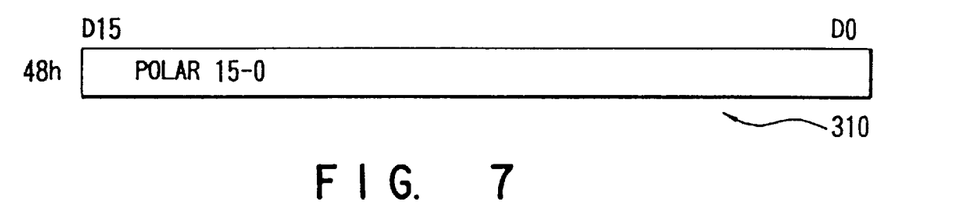
FIG. 7 is a drawing to help explain the data contents of the polarity reversing register referred to at the peripheral hardware of FIG. 3.

As shown in FIG. 7, the polarity reversing register 310 is a 16-bit configuration register that can be read from and written into by the CPU 11. In this register, pieces of polarity switching information POLAR15 to POLAR0 indicating the presence or absence of the reversing of polarity for each of interrupt levels 0 to 15 respectively. Each bit in POLAR15 to POLAR0 indicates the reversing of polarity by "1" and the unreversing of polarity by "0".

With the PCI interrupt request signals INTA# to INTD# low and the internal ISA interrupt and serial interrupt high, each input port of the interrupt controller 155 responds to an interrupt request signal in positive logic. Therefore, by setting the bits corresponding to the interrupt levels allocated to INTA# to INTD# at "1", all of internal ISA interrupt, serial interrupt, and PCI interrupt can be supplied in positive logic to the input ports of the interrupt controller 155. Conversely, all of internal ISA interrupt, serial interrupt, and PCI interrupt can be supplied in negative logic to the input ports of the interrupt controller 155 by setting the bits corresponding to the interrupt levels allocated to INTA# to INTD# at "0".

The interrupt controller 155 of FIG. 3 has 16 input ports (IR0 to IR15) to which interrupt levels 0 to 15 are allocated respectively, and generates an interrupt signal INTR to the CPU 11 when an interrupt request signal has been supplied to any one of the input ports. In response to the INTR, the CPU 11 executes an acknowledge cycle. In the interrupt acknowledge cycle, an interrupt vector is read from the interrupt controller 155.

The interrupt controller 155 can switch the interrupt signal sensing type between level sensing and edge sensing for each input port. The switching of the sensing type is controlled by the level/edge switching information set in the level/edge switching register 311. The data structure of the level/edge switching information set in the level/edge switching register 311 is shown in FIGS. 8A and 8B.

Figure 8A:
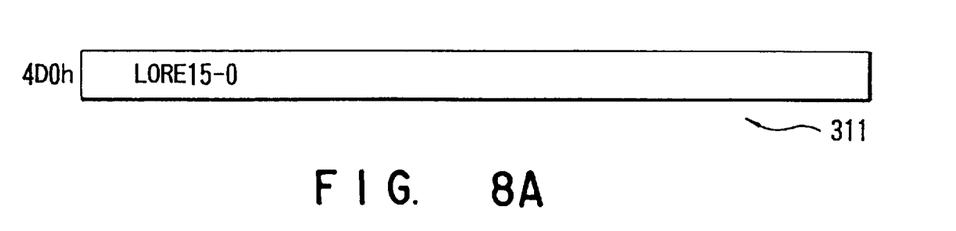
FIGS. 8A and 8B are drawings to help explain the data contents of a level/edge switching register in the interrupt controller provided in the computer system of FIG. 1.
Figure 8B:
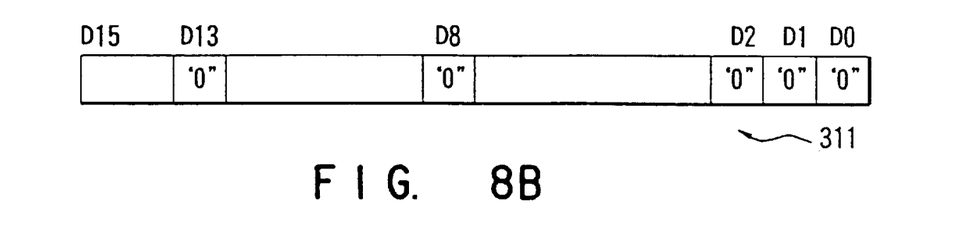

As shown in FIG. 8A, the level/edge switching register 311 is a 16-bit configuration register that can be read from and written into by the CPU 11. In this register, pieces of level/edge switching information LORE15 to LORE0 specifying the sensing type (level/edge) for each input port of the interrupt controller 155 are set. In this case, the pieces of level/edge switching information LORE15 to LORE0 may be set automatically according to the pieces of polarity switching information POLAR15 to POLAR0 set in the polarity reversing register 310.

Each bit in the pieces of level/edge switching information LORE15 to LORE0 indicates level sensing by "1" and edge sensing by "0". Therefore, as shown in FIG. 8B, the bit corresponding to unused interrupt level 2 and the bits corresponding to the interrupt levels 0, 1, 8, and 13 used fixedly in internal ISA interrupt are fixed to "0".

Figure 9:
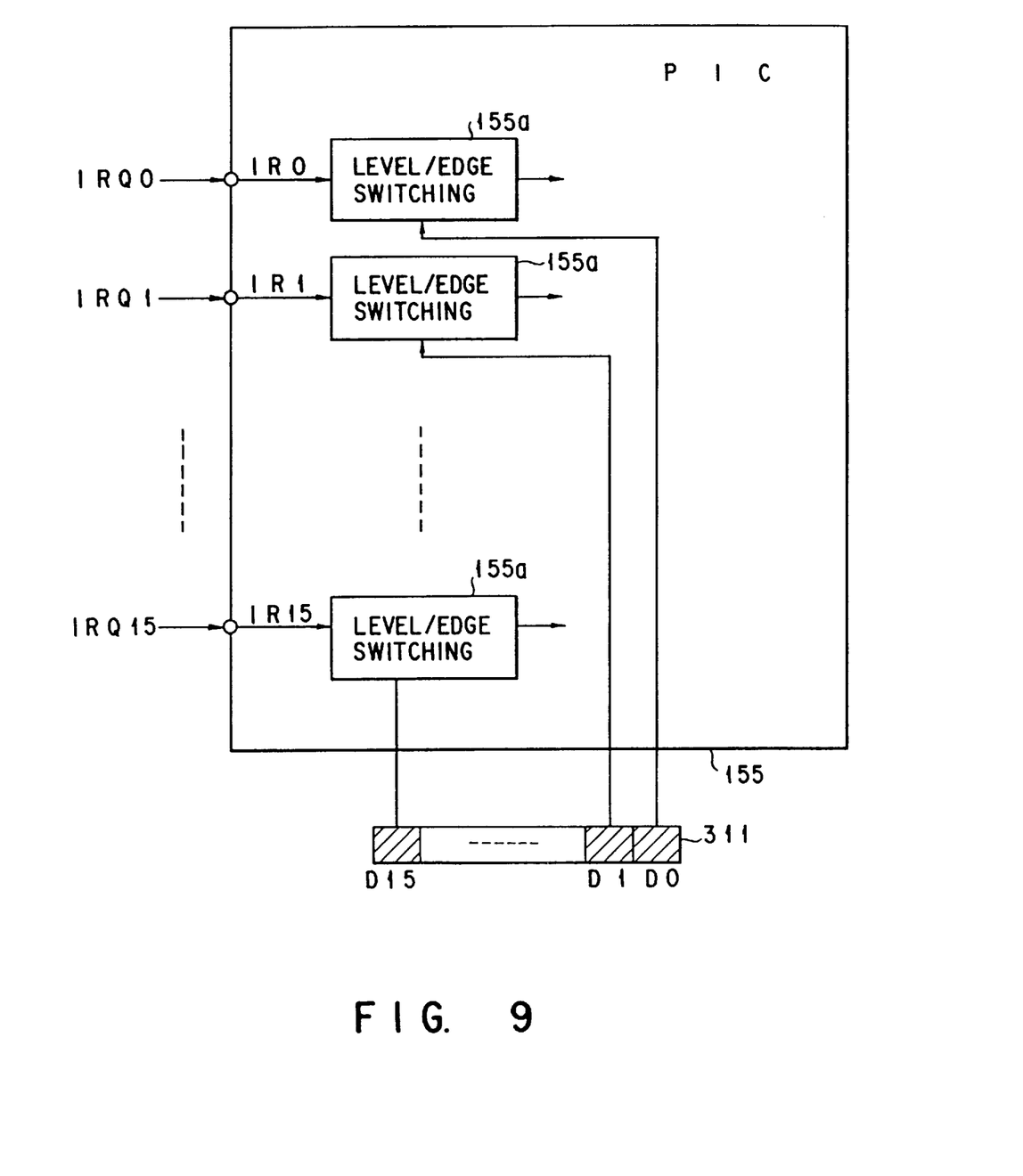
FIG. 9 is a block diagram showing the configuration of the interrupt controller provided in the computer system of FIG. 1.

FIG. 9 shows the configuration of the interrupt controller 155. Each port of the interrupt controller 155 is provided with a level/edge switching circuit 155a as shown in the figure. The interrupt controller can switch the response to the interrupt signal by the use of these level/edge switching circuit 155a.

Specifically, when the level sensing type has been specified, each level/edge switching circuit 155a makes the level sensing type valid during the time when the input interrupt signal is at a high level and makes the type invalid during the time when the input interrupt signal is at a low level. On the other hand, when the edge sensing type has been specified, once the input interrupt signal has gone high, even if the input interrupt signal has changed to a low level thereafter, each level/edge switching circuit keeps the edge sensing type valid until an interrupt acknowledge cycle has been generated.

As described above, in the interrupt control system of the embodiment, the interrupt controller 155 is designed to be able to switch between the edge sensing type and the level sensing type for each port. The sensing type for each port is determined by the level/edge switching information set in the register 311. The ISA/PCI interrupt select circuit 306 selects the type of an interrupt request signal line (ISA interrupt request signal line IRQx or PCI interrupt request signal line INTX#) to be connected to each input port (IR0 to IR15) of the interrupt controller 155. Thus, it is possible to process both of an ISA interrupt request signal and a PCI interrupt request signal that differ from each other in the sensing type (level/edge), and accordingly suitable interrupt service can be given to those interrupt request signals.

Furthermore, serial interrupt can be used, which helps realize an interrupt control system suitable for a portable computer having a PCI system architecture.

As has been explained until now, with the present invention, a plurality of interrupt request signals containing multiple types of interrupts can be processed by a single controller and an interrupt control system particularly suitable for a portable computer having a PCI system architecture can be realized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For instance, while in the above embodiment, a plurality of interrupt request signals containing PCI interrupts, ISA interrupts, and serial interrupts are processed by a single interrupt controller, the present invention is not restricted to this. Further, the present invention may be applied to the processing of only PCI interrupt requests and ISA interrupt requests and also to the processing of only PCI interrupt requests and serial interrupt requests. Furthermore, while in the embodiment, the process of selecting the polarity is performed after ISA/PCI interrupt selection has been made, the polarity selection process may be performed before the ISA/PCI interrupt selection.

What is claimed is:

1. An interrupt control system provided in a computer having a processor, an interrupt controller capable of outputting an interrupt signal to the processor, a first bus having a plurality of first interrupt signals, and a second bus having a plurality of second interrupt signals, said system comprising:

means for mapping interrupt levels onto said plurality of first interrupt signals of said first bus; and means for selecting one of said plurality of mapped first interrupt signals and said plurality of second interrupt signals in accordance with signal selection information indicating which type of interrupt signals should be selected, so as to supply selected interrupt signals to signal lines connected to said interrupt controller.

2. A system according to claim 1, wherein said mapping means includes means for holding priority level information indicating priority levels to be given to said plurality of first interrupt signals.

3. A system according to claim 2, wherein said signal selection information includes a plurality of enable bits for enabling/disabling the interrupt level mapping of said plurality of first interrupt signals.

4. A system according to claim 3, wherein said selecting means includes means for executing the selections in accordance with said priority level information and said signal selection information.

5. A system according to claim 1, wherein a low-level signal on said first bus is defined as active, and a rising edge of a signal on said second bus is defined as active.

6. A system according to claim 5, further comprising means for holding level/edge setting information indicating to which of an edge sensing type and a level edge sensing type of said interrupt controller should be set.

7. A system according to claim 1, wherein said first bus is a PCI (Peripheral Component Interconnect) bus, and said second bus is an ISA (Industrial Standard Architecture) bus.

8. A interrupt control device provided in a computer having a processor, an interrupt controller capable of outputting an interrupt signal to the processor, a first bus having a plurality of first interrupt signals, and a second bus having a plurality of second interrupt signals, said device comprising:

a configuration register used for mapping interrupt levels onto said plurality of first interrupt signals of said first bus; and an interrupt select circuit for selecting one of said plurality of mapped first interrupt signals and said plurality of second interrupt signals in accordance with signal selection information indicating which type of interrupt signals should be selected, so as to supply selected interrupt signals to signal lines connected to said interrupt controller.

9. A device according to claim 8, wherein said configuration register holds priority level information indicating priority levels to be given to said plurality of first interrupt signals.

10. A device according to claim 9, wherein said signal selection information includes a plurality of enable bits for enabling/disabling the interrupt level mapping of said plurality of first interrupt signals.

11. A device according to claim 10, wherein said interrupt select circuit executes the selections in accordance with said priority level information and said signal selection information.

12. A device according to claim 8, wherein a low-level signal on said first bus is defined as active, and a rising edge of a signal on said second bus is defined as active.

13. A device according to claim 12, further comprising a register for holding level/edge setting information indicating to which of an edge sensing type and a level edge sensing type of said interrupt controller should be set.

14. A device according to claim 8, wherein said first bus is a PCI (Peripheral Component Interconnect) bus, and said second bus is an ISA (Industrial Standard Architecture) bus.

15. An interrupt control method for use in a computer having a processor, an interrupt controller capable of outputting an interrupt signal to the processor, a first bus having a plurality of first interrupt signals, and a second bus having a plurality of second interrupt signals, said method comprising:

mapping interrupt levels onto said plurality of first interrupt signals of said first bus; and selecting one of said plurality of mapped first interrupt signals and said plurality of second interrupt signals in accordance with signal selection information indicating which type of interrupt signals should be selected, so as to supply selected interrupt signals to signal lines connected to said interrupt controller.

16. A method according to claim 15, further comprising the step of holding priority level information indicating priority level to be given to said plurality of first interrupt signals.

17. A method according to claim 16, wherein said signal selection information includes a plurality of enable bits for enabling/disabling the interrupt level mapping of said plurality of first interrupt signals.

18. A method according to claim 17, wherein said selection step includes the step of executing the selections in accordance with said priority level information and said signal selection information.

19. A method according to claim 15, wherein a low-level signal on said first bus is defined as active, and a rising edge of a signal on said second bus is defined as active.

20. A method according to claim 19, further comprising the step of holding level/edge setting information indicating to which of an edge sensing type and a level edge sensing type of said interrupt controller should be set.

21. A method according to claim 15, wherein said first bus is a PCI (Peripheral Component Interconnect) bus, and said second bus is an ISA (Industrial Standard Architecture) bus.

* * * * *